Figure 1:
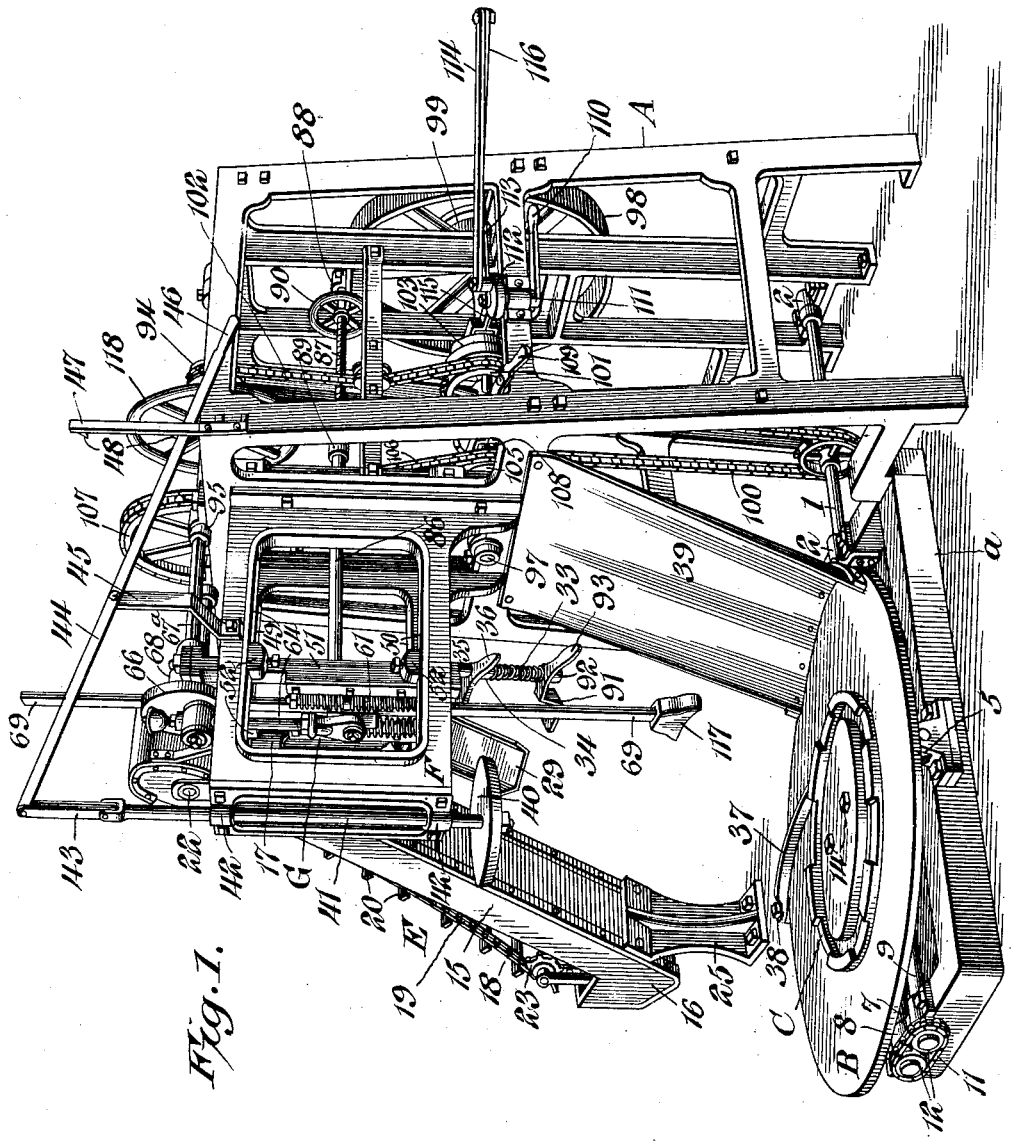

A. GLENN.
CONDUIT TILE MOLDING MACHINE.
APPLICATION FILED SEPT. 19, 1910.

1,095,104.

Patented Apr. 28, 1914.
6 SHEETS—SHEET 1.

Witnesses
Howard D. Orr.
C. Bradway.

Allen Glenn, Inventor,
By E. G. Siggers
Attorney

A. GLENN.
CONDUIT TILE MOLDING MACHINE.
APPLICATION FILED SEPT. 19, 1910.
1,095,104.
Patented Apr. 28, 1914.
6 SHEETS—SHEET 2.
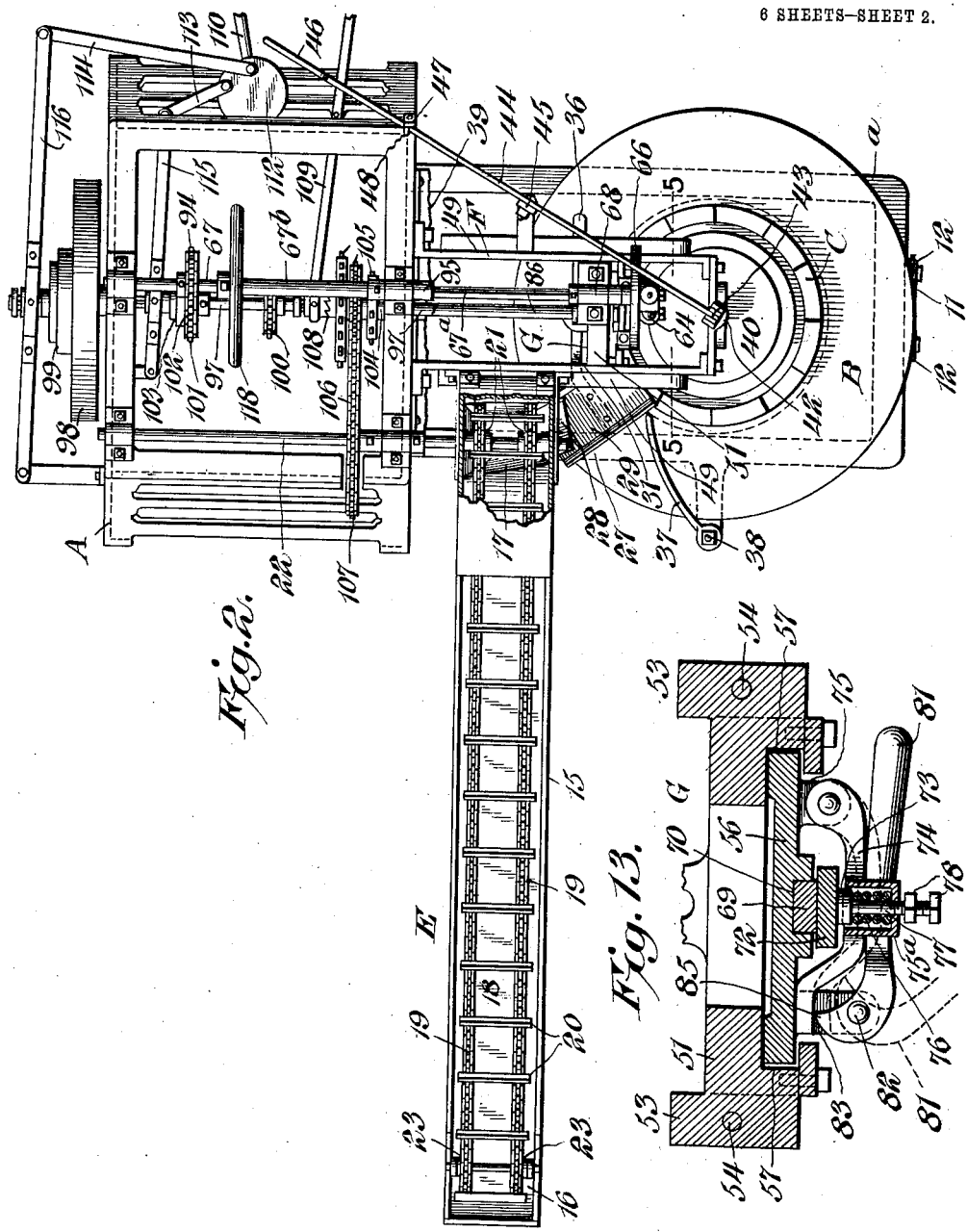
Witnesses
Howard D. Orr.
C. Bradway.
Allen Glenn, Inventor,
By E. G. Siggers.
Attorney A. GLENN.
CONDUIT TILE MOLDING MACHINE.
APPLICATION FILED SEPT. 19, 1910.
1,095,104.
Patented Apr. 28, 1914.
6 SHEETS—SHEET 3.
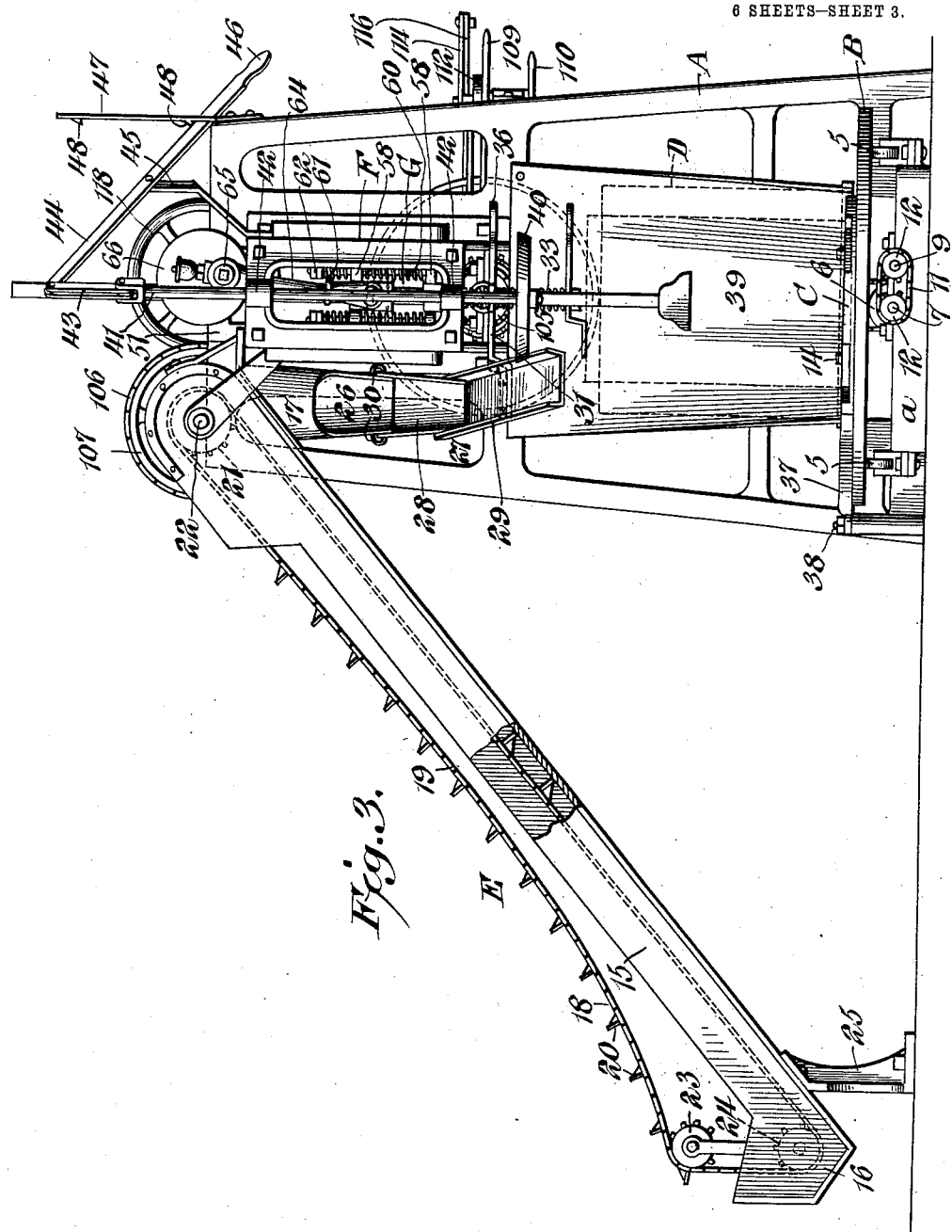
Witnesses
Howard D. Orr.
C. Bradway.
Allen Glenn, Inventor,
By E. G. Siggers
Attorney

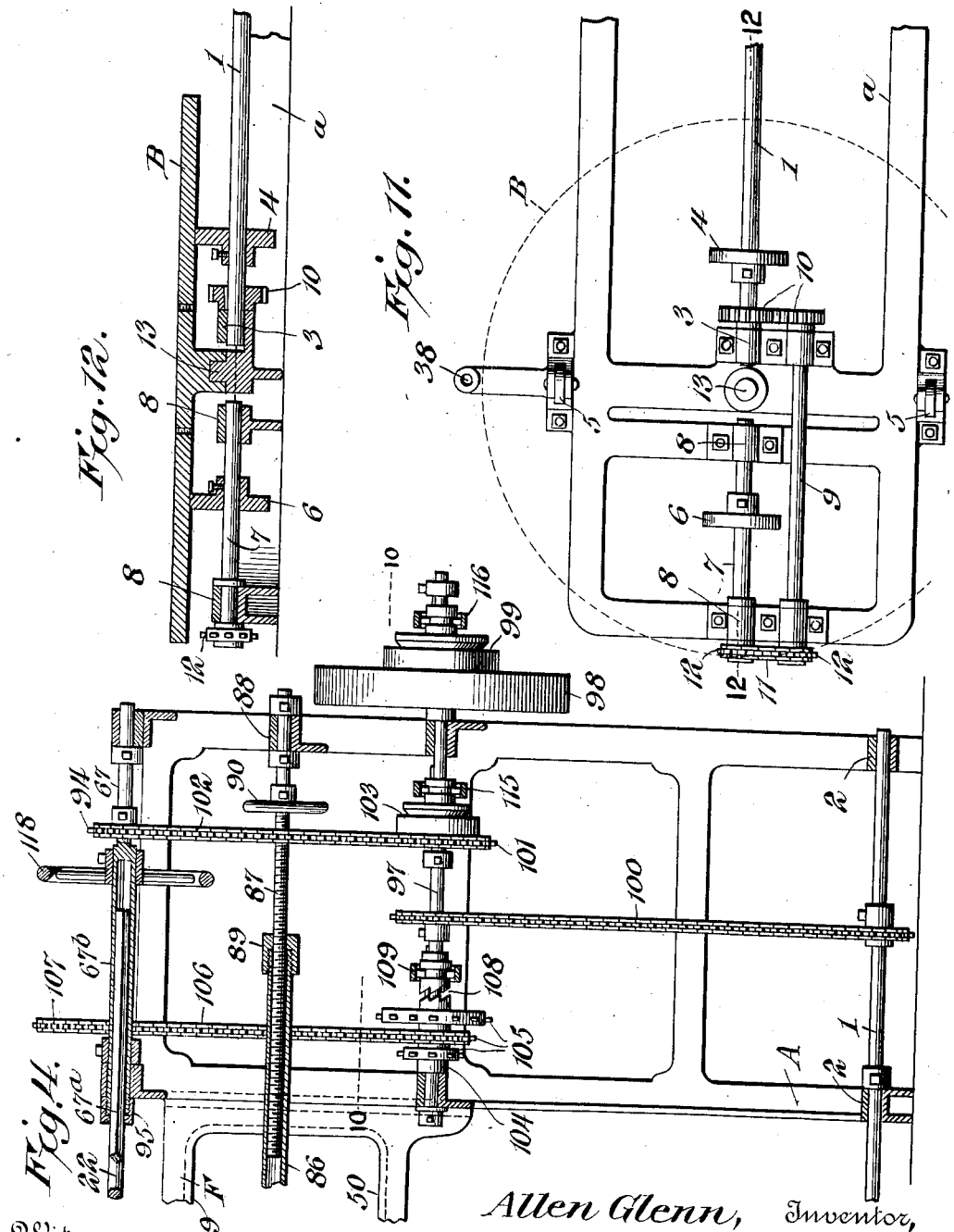

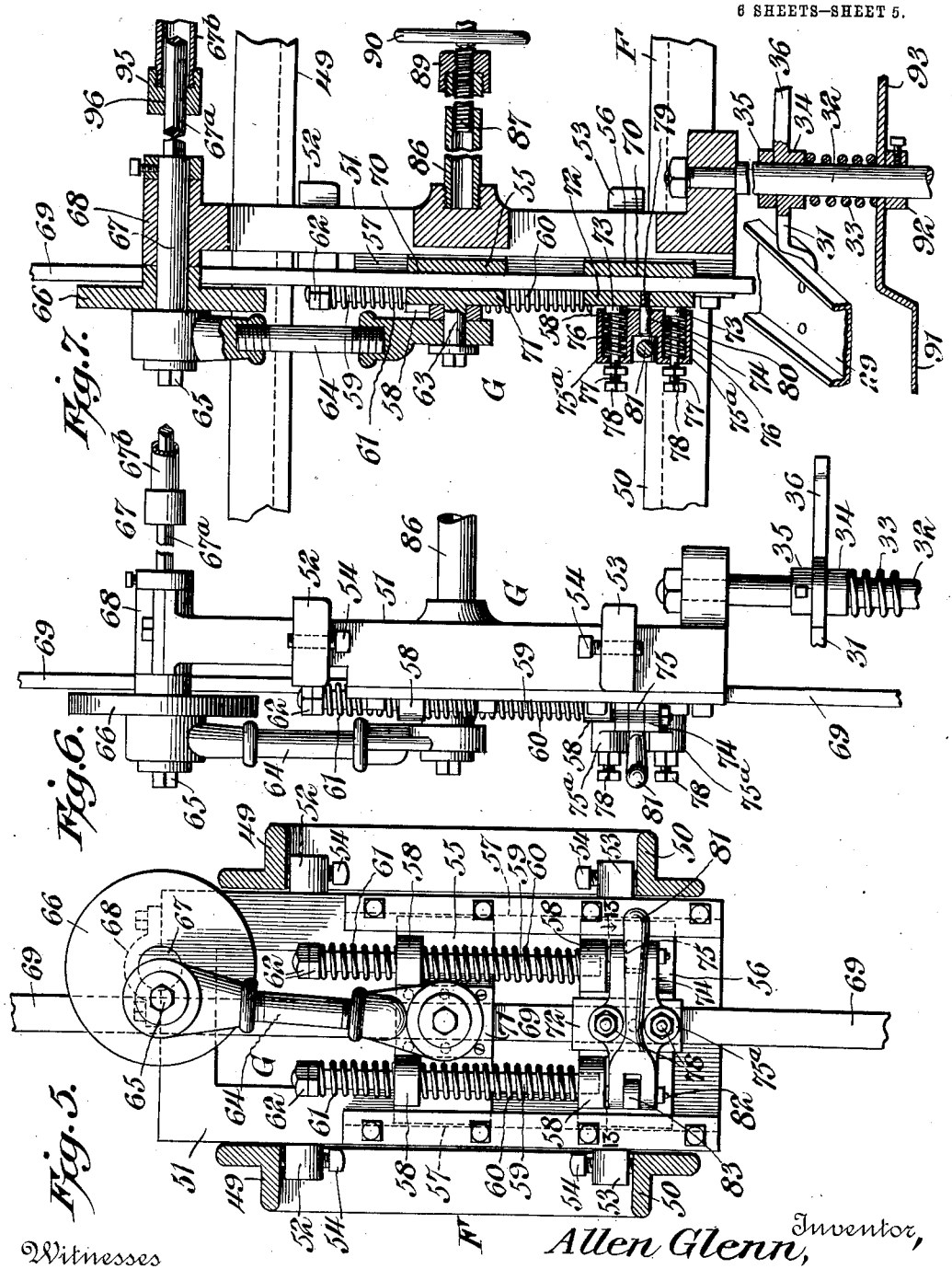

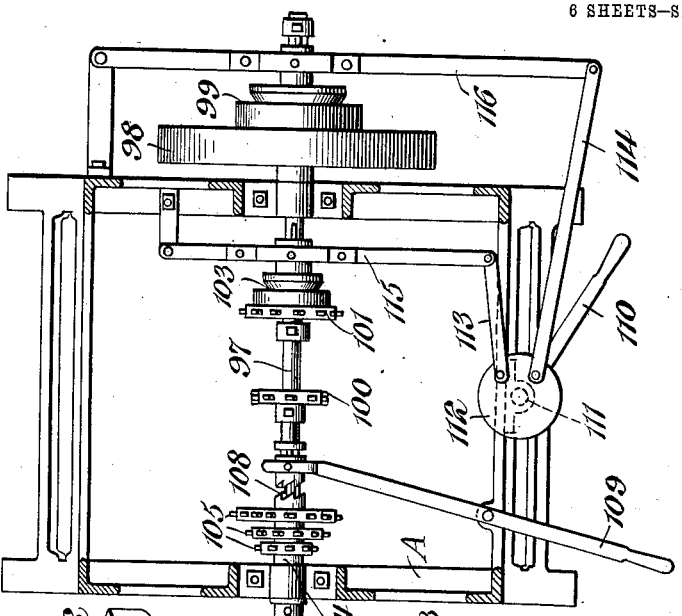

UNITED STATES PATENT OFFICE.

ALLEN GLENN, OF ENID, OKLAHOMA, ASSIGNOR TO CHARLES J. QUINN AND CHARLES C. QUINN, BOTH OF BOONE, IOWA.

CONDUIT-TILE-MOLDING MACHINE.

1,095,104.

Specification of Letters Patent. Patented Apr. 28, 1914.

Application filed September 19, 1910. Serial No. 582,732.

*To all whom it may concern:*

Be it known that I, ALLEN GLENN, a citizen of the United States, residing at Enid, in the county of Garfield and State of Oklahoma, have invented a new and useful Conduit-Tile-Molding Machine, of which the following is a specification.

This invention relates to a machine for making conduit tiles, the machine being of that type in which concrete is continuously fed to a rotary mold and automatically tamped by a reciprocating tamping device, and the invention relates more particularly to improvements in the machine disclosed in United States Letters Patent No. 809,940, granted to me January 16, 1906.

The invention has for one of its objects to improve and simplify the construction and operation of machines of this character so as to produce tile of superior quality and with greater despatch by reason of a novel arrangement of coacting mechanisms for rotatably supporting the mold, feeding material thereto, and actuating the tamper in such a manner as to impart a hard blow to the cement or concrete in the mold, while at the same time the tamper is allowed to gradually rise as the tile builds up in the mold.

Another object of the invention is the provision of novel means for adjusting the tamping device for molds of different sizes, and controlling means for throwing the tamper into operation after the feed of the material to the mold has begun.

An additional object is the employment of an endless conveyer for supplying material, and a novel chute arrangement for directing the material into the mold while the latter is held on the table by the mold-engaging ring of the latter and by a centering device engaging the top of the mold.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention, Figure 1 is a perspective view of the machine. Fig. 2 is a plan view thereof. Fig. 3 is a front view, showing the relation of the concrete feeding mechanism to the mold of the mold-carrying table, the mold being shown in dotted lines on the latter. Fig. 4 is a vertical section looking from the side opposite from the material conveyer. Fig. 5 is an enlarged vertical section on line 5—5, Fig. 2, showing the tamping mechanism in front elevation. Fig. 6 is a side view of the tamping mechanism. Fig. 7 is a central vertical section of the tamping mechanism. Fig. 8 is a group view of the various parts of the cross-head of the tamping mechanism disassociated. Fig. 9 is a perspective view of the frame for the tamping mechanism cross-head. Fig. 10 is a horizontal section on line 10—10, Fig. 4. Fig. 11 is a plan view of the table-operating means. Fig. 12 is a sectional view on line 12—12, Fig. 11. Fig. 13 is a detail section on line 13—13, Fig. 5.

Similar reference characters are employed to designate corresponding parts throughout the views.

Referring to the drawings, A designates the main frame of the machine which is a skeleton-like structure of any approved design and has a base extension in the form of a rectangular frame *a* over which the mold-carrying table B is disposed. This table is a circular disk which is turned down perfectly flat on its upper face to receive the molds, the ends of which are planed off true to rest perpendicularly on the table. The table is continuously rotated by means of a horizontal shaft 1 journaled in bearings 2 at the base of the main frame A, and one end of the shaft extends under the table and is supported in a bearing 3 on the base frame extension *a*. This shaft has a friction wheel or equivalent device 4 which engages the under side of the table to rotate the same while it is supported on rollers 5 disposed at diametrically opposite points under the table and mounted on the extension *a*. To provide a better driving effect, a second friction wheel or equivalent device 6 is employed which is mounted on the shaft 7 journaled in bearings 8 on the base extension *a*, and this shaft is driven by a countershaft 9 disposed under the table and driven from the shaft 1 by intermeshing gears 10, and, by means of a sprocket chain 11 passing over sprocket wheels 12 on the outer ends of the shafts 7 and 9, the shaft 7 is driven. By this arrangement, the shaft 7 can be disposed in alinement with the shaft 1 which is arranged in diametrical relation to the table and hence the points of engagement between the friction wheels and under side of the table will be at diametrically-opposite points with respect to the central pivot 13 on which the table turns. The friction wheels are mounted on and so secured to their respective shafts that they can be moved inwardly or outwardly on the latter to change the speed of rotation of the table according to the size of the mold and rate of feed of material of the mold. On the top of the table is arranged and fastened a mold holder C in the form of a disk or wheel that constitutes a seat for the lower end of the mold D, shown by dotted lines. The mold holder is secured to the table by bolts 14 so that holders of different sizes may be used interchangeably for molds of different diameters.

The concrete or other material from which the tiles are made is supplied to the mold by a feeding mechanism E which is in the form of an elevating trough 15 that has its lower end formed into a hopper 16 and its upper end formed into a downwardly-directing hood 17. Arranged in the trough is an endless conveyer 18 consisting of chains 19 having spaced vanes or buckets 20, which ride in the bottom of the trough 15 and conduct material from the hopper to the upper discharge end of the trough where the hood directs the material downwardly. The endless conveyer passes around sprocket wheels 21 arranged on a driving shaft 22 at the upper end of the trough, and the lower end of the conveyer passes around idler sprockets 23 and 24 suitably mounted at the hopper. The material, after being properly mixed, is shoveled or otherwise supplied to the hopper 16 from which it is carried upwardly by the continuously-moving endless conveyer. The upper end of the trough is mounted on the frame, while the lower end is supported on a floor bracket 25, as shown in Fig. 3. The hood terminates in a spout 26 that delivers material into a chute 27 that is composed of two sections 28 and 29. The section 28 is located between the spout 26 and the lower section 29 and rests on the latter in overlapping relation to the upper end thereof, and the upper end of the section 28 is supported on staple-like pivots 30 or equivalent devices for hingedly connecting it with the spout 26. The section 29 is mounted on a horizontally-disposed swinging arm 31 so that the discharge end of the chute can be adjusted according to the size of the mold. The arm 31, as shown in Figs. 6 and 7, is mounted on a vertically-disposed relatively-fixed rod 32 that forms a pivot for the arm, and the arm is frictionally held in different positions of adjustment by means of a spring 33 on the rod 32 pressing the hub 34 of the arm against an abutment such as a collar 35 on the rod or member 32. To conveniently adjust the arm, the same is provided with a handle 36 which is turned in one direction or the other to throw the discharge end of the chute inwardly toward the center of the table B or outwardly therefrom so that the lower end of the chute will be directly over the chamber of the mold. The material that falls out of the mold as the latter is reaching the final stage of filling will drop on the table B and will be removed from the table by a scraper 37, Fig. 1, which scraper is in the form of a bar having its outer end fastened at 38 at a point beyond the periphery of the table, and its inner end disposed adjacent the mold so that the scraper will be disposed approximately in tangential relation to the latter, and as the table rotates, the material will be carried to the edge or periphery thereof and deposited in a heap at the side of the table. Between the inner edge of the table and the front side of the main frame A, a downwardly inclined apron or shield 39 is provided for preventing material from working off the table at the point where the driving shaft 1 is located and whatever material is thrown out of the mold and collects on the shield will roll down the latter to the table and be removed by the scraper 37.

Extending forwardly from the main frame is a bracket F which is disposed above the table in overhanging relation thereto for supporting the tamper mechanism and the device for centering the upper end of the mold. This latter device consists of a wheel or disk 40 disposed axially above the table B and rotatably mounted on the lower end of a vertically-disposed shaft 41 which is journaled in bearings 42 on the front end of the bracket F. The wheel or disk 40 has its periphery beveled so that the wheel will have a downward taper to permit the same to readily engage in the upper open end of the inner shell of the mold and cause the mold to center itself on the table by reason of the taper of the wheel or disk. The wheel or disk is solid and prevents the material from entering the hollow of the mold without, however, interfering with the material passing between the inner and outer shells of the latter. The upper end of the shaft 41 is connected by a link 43 with a lever 44 which is fulcrumed on an upwardly-extending arm 45 secured to and rising from the top of the bracket F. The end of the lever opposite from that connected with the link is formed into a handle 46 disposed at one side of the frame A where it can be conveniently operated, and the lever is held in different positions by means of a catch consisting of an upwardly-extending member 47 on the main frame A having shoulders or abutments 48 with which the lever engages. When the lever engages the lower abutment 48, the centering wheel or disk 40 will be raised to its highest point for permitting the molds to be applied to or removed from the table. When the mold-centering device is in operation, the lever 46 is free from the catch 47 so that the wheel or disk 40 will rest on and rotate with the mold.

The forwardly-extending bracket F, besides forming a support for the mold-centering device and tamping mechanism, forms a support for the upper end of the material conveyer E. The bracket is provided with a pair of upper spaced guideways or rails 49 and a pair of lower spaced guideways or rails 50 which extend parallel to each other. These guideways form means for supporting the tamping mechanism G so that it can be adjusted inwardly or outwardly to adapt the mechanism for molds of different diameters. The tamping mechanism, which is shown in coöperative relation with the other parts in Fig. 1 and in detail in Figs. 5 to 7, inclusive, consists of a vertically-disposed rectangular frame 51 which has its upper portion projecting between the upper pair of guide rails 49 and its lower portion disposed between the lower guide rails 50, and projecting laterally from the frame are upper and lower lugs 52 and 53 extending transversely to the adjacent guide rails, said lugs having set screws 54 which clamp the frame 51 on the guide rails of the bracket F to thus hold the tamping mechanism in set position. By loosening the set screws, the frame 51 can slide inwardly or outwardly on the guide rails while being supported in upright position by the lugs 52 and 53. The frame 51 constitutes a guide for the cross-head of the tamping mechanism which is of special device so that a hard, powerful blow can be imparted to the concrete and yet the tamper can gradually rise as the concrete becomes packed in the building up of the tile in the mold.

The details of the cross-head will be more clearly understood by reference to Fig. 8, in connection with Figs. 5 to 7, inclusive. The cross-head consists of upper and lower blocks or slides 55 and 56 which have their ends movable in vertical guideways 57 on the frame 51 and each block has a pair of forwardly-projecting and apertured lugs 58 so arranged that the lugs of one block are disposed vertically in line with those of the other block for the reception of rods 59 which pass loosely through the lugs of the upper block 55 and are threaded in the lugs of the lower block 56. Arranged on these rods are springs 60 which are confined between the lugs 58, and on the upper ends of the rods, which latter are long enough to project above the lugs on the upper block 55, are springs 61 which have their lower ends bearing on the lugs 58 and their upper ends bearing on nuts 62 threaded on the rods 59 for holding the parts in assembled position and for adjusting the tension of the springs. It will thus be seen that the lower block or slide 56 is yieldingly connected with the upper block by means of the springs which form cushioning devices. The upper block is provided with a forwardly-projecting pin 63 to which the lower end of the pitman 64 is connected, the upper end of the pitman being connected with a crank pin 65 on the crank disk 66, the shaft 67 of which is journaled in a bearing 68 mounted on the cross-head carrying frame 51 at one side of the vertical center line thereof, as shown in Fig. 5. As the shaft rotates, the cross-head is given a vertical reciprocatory movement for operating the tamper bar or rod 69 which is yieldingly connected with the cross head. The tamper bar 69 is of non-circular cross-section and slides in vertical guideways or seats 70 formed in the front faces of the slides or blocks 55 and 56 of the cross-head. The bar is held in the guideway of the block 55 by a plate 71 which is bolted to the front of the block without frictionally engaging the tamper bar so that the latter will be free to move up and down in the upper block of the guideway, the said plate 71 being provided with the pin 63 to which the operating pitman is connected. The lower block 56 carries the device for frictionally gripping or tensioning the tamper bar so that the latter can gradually work upwardly in the cross-head as the tile builds up in the mold. For this purpose, the shoe or friction plate 72 is employed at the open side of the guideway 70 of the lower block 56 so as to engage the front surface of the tamper bar. This shoe is yieldingly held in frictional engagement with the bar by followers 73 carried by a lever 74 which extends transversely to the tamper bar and has one end fulcrumed on a lug 75 projecting from the block 56. The followers 73 pass through chambers 75$^a$ in the arm or lever 74, and in each chamber is a spring 76 which urges the follower rearwardly to force the friction device or shoe 72 against the tamper bar.

The rods 77 of the followers extend out of the chambers 75 and are provided with nuts 78. The shoe 72 is provided with a forwardly projecting pin 79 which enters a socket 80 in the lever 74, whereby the latter constitutes a carrier or support for the friction shoe. The support 74 is normally held in clamped position by a cam lever 81 which is fulcrumed at 82 on a forwardly-projecting lug 83 on the lower block 56 of the crosshead. The cam lever is bifurcated so as to span the projection 83 and the free end of the lever or carrier 74 is also bifurcated to span the same projection. When the high point 85 of the cam is in engagement with the free end of the lever 74, the handle of the lever 81 will bear against the front face of the lever or carrier 74 and thus lock the friction shoe in yielding engagement with the tamper bar. When the clamping cam lever 81 is released, it will be in a dotted line position, Fig. 13, so that the pressure on the friction shoe will be removed to permit the tamper bar to be quickly lowered to initial position for the next tile to be tamped in the mold. By this construction, it will be seen that the tamper bar is not positively locked to the cross-head but will yield gradually in an upward direction as the concrete is tamped in the mold, and when the resistance of the concrete becomes greater than the resistance of the friction plate or shoe on the tamper bar, the latter will slide in the cross-head, the cross-head maintaining a uniform stroke. The springs 60 and 61 cushion the tamper and cause it to strike a hard blow and take off the jar on the rebound. As a result, a firmly packed tile can be made by continuously feeding the material to the mold, the tamper adjusting itself to the condition of the concrete as the building up of the tile progresses. The concrete must be packed to a certain density before the tamper will yield and move upwardly, and this being so, the tile will be of uniform density at all points.

To adjust the tamping device backwardly and forwardly over the table for molds of different diameters, a horizontally-extending tubular rod 86 is secured to the rear side of the cross-head frame 51, and extending in this rod is an adjusting screw 87 having its end rotatably mounted in a bearing 88 on the main frame and held against longitudinal movement. The screw is threaded in a collar or cap 89 on the rear end of the rod 86, and the said screw is turned by a hand wheel 90, whereby the tamper device will be moved back and forth on the bracket F.

As clearly shown in Fig. 7, the member 32 for supporting the lower section of the chute is secured to the frame 51 for the cross-head of the tamping device, and hence as the device is adjusted back and forth, the lower section of the chute will be always in proper position to discharge the material into the mold, irrespective of the size thereof. Mounted on this member 32 is a trowel 91 which can be swung forwardly over the top end of the mold after the tamping operation is completed for leveling off the upper end of the tile. This trowel is in the form of a lever or arm fulcrumed on the lower end of the member 32 and is held by the spring 33 against an abutment 92 on the member 32 so that the said spring forms a common friction device for holding the trowel 91 and chute-supporting element 31 in different positions of adjustment without any positive fastening means being required. To conveniently manipulate the trowel, the same is provided with a handle 93 which projects in the same direction as the handle 36, so that both devices can be adjusted from the side of the machine where the operator stands.

As shown in Fig. 2, the crank shaft 67 is made in two sections connected by a slip joint, so that the tamping mechanism can be adjusted back and forth. The two sections $67^a$ and $67^b$ are telescopically connected and rotation can be imparted to the section $67^a$ by the section $67^b$ which is provided with a sprocket wheel 94. The section $67^b$ is in the form of a hollow shaft or sleeve which has a collar or cap 95 on one end which may be provided with a non-circular opening 96 for feeding the solid portion $67^a$ which is of non-circular cross-section. By this means, the sections can have a relative longitudinal sliding movement and yet both sections will rotate together.

The power for driving the various mechanisms of the machine is derived from a main shaft 97 journaled in bearings on the main frame and having at its rear end a belt pulley 98 which is adapted to be connected by a clutch 99 with the shaft for rotating the same. This shaft 97 drives the table-rotating shaft 1 by a sprocket chain 100, so that as soon as the clutch 99 is closed, the table will begin to rotate. On the shaft 97 is a loose sprocket wheel 101 disposed in line with the sprocket wheel 94 on the tamper-operating shaft, and around these wheels pass a sprocket chain 102. The wheel 101 is operatively connected with the main shaft by a clutch 103. Also on the main shaft 97 is a sleeve 104 which has three sprockets 105 of different diameters and around any one of which passes a sprocket chain 106 which meshes with a sprocket wheel 107 on the material conveyer driving shaft 22. This sprocket wheel 107 can be adjusted on the shaft 22 into alinement with any of the sprockets 105 so as to drive the conveyer at different speeds, according to the size of the molds. The sleeve 104 is operatively connected with the shaft 97 by a clutch 108 which is thrown into and out of operation by a lever 109 fulcrumed on one side of the main frame, as shown in Fig. 1. The clutches 99 and 103 are adapted to close successively and are manipulated by a single controlling lever 110 which is fulcrumed on the main frame adjacent the lever 109, it being noted that the various operating levers are arranged at the same side of the machine so that they can be manipulated by one attendant. The lever 110 is connected with a vertical shaft 111 which carries at its upper end a crank disk 112. This disk is connected by separate links 113 and 114 with the clutch-throwing levers 115 and 116 for the clutches 103 and 99, respectively, the levers being fulcrumed on the main frame, and the points of connection of the links 114 and 115 are so arranged on the crank disk 112 that the controller 110 can be moved in two steps for successively closing the clutches 99 and 103. During the first portion of the movement of the lever 110, the clutch 99 will be closed while the clutch 113 remains open, as the lever 115 has practically no movement. During the last portion of the movement of the controller 110, the clutch 103 will be closed while the lever 116 will have substantially practically no movement. It is preferable to start the mold-carrying table and the material-conveying mechanism before the tamper begins to operate, so that material will be supplied to the mold to be operated on by the tamper and thus prevent the latter from striking the table, which would be the case if the tamper was thrown into operation simultaneously with the rotation of the table.

In operation, an empty mold is placed in the mold-holding ring of the table B and the handle end 46 of the lever 44 is released from the catch 48 so that the centering device 40 can drop upon the mold to center the same and hold it in proper relation to the table. The tamper will, of course, be in raised position from having finished the previous tile, and if a mold of different diameter than the one previously used is employed, the tamping device will be adjusted by turning the hand wheel 90 so that the foot 117 of the tamper will be positioned between the inner and outer shells of the mold. The cam lever 81 of the tamping device is now released so that the tamper bar can be lowered to the bottom of the mold, and when in this position, the cam lever 81 is moved to re-clamp the tamper to the cross-head. With these adjustments, the machine is ready to operate and the attendant first throws the lever 109 to start the conveyer and about the same time moves the controller 110 a sufficient distance to throw in the main clutch 99 to rotate the shaft 97. As a consequence, the table B and endless conveyer of the mechanism E will be set into operation. After the conveyer has operated a short time, the lever 110 is moved still farther to clutch in the tamping mechanism, and as the result, the tamper shaft will be rotated and the tamper rod reciprocated in the mold to compact the material already supplied thereto. The material is fed continuously to the mold and the tamper which reciprocates about three hundred strokes a minute and produces pressure varying from thirty to forty pounds, will firmly compact the concrete, and as the resistance of the concrete increases, the tamper gradually rises in the reciprocating cross-head until the mold is completely filled. When this takes place, the controller 110 is moved in a reverse direction a sufficient distance to release the clutch 113 for stopping the tamper at the same time the lever 109 is actuated to stop the material conveyer. The wheel 118 on the tamper shaft 67 is turned to raise the tamper off the tile, and in doing this, a clearance is provided under the foot of the tamper for permitting the trowel to be thrown into operative position for leveling off the top of the tile. While the trowel is in use, the table continues to rotate until the tile is completely leveled off, and when this is finished, the controller 110 is moved back to its fully released position to stop the rotation of the table and the trowel 91 is returned to initial position. Next, the lever 47 is actuated to raise the device 40 out of contact with the mold so as to permit the latter with the tile therein to be removed from the table B. It will thus be seen that the tamping of the tile is entirely automatic, and that by the convenient arrangement of the controlling levers, the machine can be readily manipulated by a single attendant, it being, of course, necessary to provide helpers for maintaining the hopper on the conveyer filled with concrete and for taking off the molds with the finished tiles and replacing the empty molds on the table.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, and desire to secure by Letters Patent, is:—

1. In a machine of the class described, a mold holder, a reciprocatory tamper provided with a rod or bar, an actuating mechanism for the tamper, and yielding connecting means between the tamper rod and the actuating mechanism and traversed by and engaging the tamper rod between the ends of the latter, the actuating mechanism also including a cushioning means for the tamper and situated out of line of movement of said tamper rod through the yielding connecting means.

2. In a machine of the class described, a mold holder, a reciprocatory tamper arranged in coöperative relation with the holder, a cross head for carrying the tamper and including an elastic clamp constituting a yielding guiding member for the tamper, a sliding block in spaced relation to the yielding guiding member and in turn forming a guiding member for the tamper, and a cushioning means between the second named guiding means and the yielding guiding means, and driving means connected to the second named guiding means for imparting reciprocatory motion to the cross head through the cushioning means.

3. In a machine of the class described, a mold holder, a tamper having a supporting bar or rod, a reciprocatory cross head including spaced guiding blocks traversed by the supporting bar of the tamper, a yieldable clamp carried by one of the blocks for engaging the tamping bar yieldingly, the other guide block being traversed by the tamping bar freely, and cushioning means on the cross head engaging the other guide member freely traversed by the supporting bar for the tamper, and driving means connected to the said other guiding member for imparting reciprocatory movement to the cross head through the cushioning means, said cushioning means being out of line with and located between the ends of the supporting bar for the tamper.

4. In a machine of the class described, a mold holder, a tamper having a supporting bar or rod, a reciprocatory cross head provided with spaced guiding blocks traversed by the supporting bar of the tamper, a yieldable clamp carried by one of the blocks for engaging the tamping bar yieldingly, the other guide block being traversed by the tamping bar freely, and cushioning means engaging the other guiding member freely traversed by the supporting bar for the tamper, and driving means connected to the said other guiding member for imparting reciprocatory movement to the cross head through the cushioning means, said cushioning means being out of line with and located between the ends of the supporting bar for the tamper, and the driving means being a constant stroke means intermediate of the ends of the tamper bar, and also out of the path of movement of said bar through the cross head.

5. In a machine of the class described, the combination of a mold holder, a reciprocatory tamper having a supporting bar or rod and arranged in coöperative relation with the holder, a cross head composed of two separated parts both traversed by the tamper bar or rod and having cushioning devices between said parts out of the path of the tamper bar or rod, said separated parts being movable one toward or from the other, a constant stroke operating means connected with one of the parts of the cross head, and yielding means for connecting the tamper bar or rod with the other part of the cross head and through which yielding means the tamper bar or rod may slide.

6. In a machine of the class described, a mold holder, a reciprocatory tamper including a tamper rod or bar, a cross head provided with a friction holding means near one end thereof for securing the tamper rod or bar slidably to said cross head, a guide member for the tamper rod or bar in spaced relation to the clamping means and on the side of the clamping means remote from the tamper head, and cushioning means supporting the guide member, said cushioning means being out of the path of the tamping bar or rod, and a driving means for the cross head connected to the guide block and acting on the cross head through the cushioning means, said driving means being arranged to one side of the line of movement of the tamper bar or rod.

7. In a machine of the class described, the combination of a mold holder, a tamper head associated therewith and provided with a carrying rod, a pair of spaced members centrally traversed by the tamper rod and movable one toward and from the other, means for yieldingly connecting the tamper rod with one of the members, an operating device connected with the other member, and rods and oppositely acting springs thereon operatively connecting the members together and through which the operating device actuates the tamper.

8. In a machine of the class described, the combination of a mold holder, a tamper having a tamper rod or bar, a supporting frame, separate blocks slidably mounted in the frame and traversed by the tamper rod or bar, operating means connected with one of the blocks, cushioning devices between the blocks and operatively connecting the same, and means for yieldingly connecting the tamper rod with the block other than the one connected with the operating means.

9. In a machine of the class described, the combination of a mold holder, a tamper comprising a head and supporting rod connected therewith, a cross head composed of spaced elements traversed by the tamper rod, rods connected with one of the elements on opposite sides of the tamper rod and slidably connected with the other element, springs on the rods on opposite sides of the element slidable on the rods and through which the said element imparts motion to the other element, means for yieldingly connecting the tamper rod with the said other element, and an actuating device connected with the element slidable on the rods.

10. In a machine of the class described, the combination of a mold holder, a tamper including a rod, spaced members having guideways traversed by the rod, cushioning means between the members out of the path of the rod, a device on one of the members for yieldingly clamping the rod in the guideway of such member, and an operating device connected with the other member out of the path of the tamper rod for reciprocating the tamper.

11. In a machine of the class described, the combination of a mold holder, a supporting frame having guideways, separate blocks disposed one above the other and slidable in the guideways, a constant-stroke actuating means connected with the upper block, cushioning means between the blocks and constituting the sole actuating means for the lower block, a tamper having a rod traversing both blocks, and means for yieldingly and releasably connecting the tamper rod with the lower block, said last named means comprising a friction shoe arranged to engage the tamper rod, and a device for exerting a yielding pressure upon the shoe.

12. In a machine of the class described, a rotatable mold holding table, a tamping device in coöperative relation to said table and movable in a direction radial to the axis of said table, a device for directing material into the mold, a trowel, and a common support for said device and trowel carried by the tamping device and participating in the radial movements thereof.

13. In a machine of the class described, a rotatable mold holding table, a tamping device in coöperative relation to the said table and movable in a direction radial to the axis of said table, a device for directing material into the mold, a trowel, and a common support for said device and trowel carried by the tamping device and participating in the radial movements thereof, said common support carrying means acting on the trowel and material directing device for frictionally holding each in different positions of adjustment independently of the other.

14. In a machine of this class described, a rotatable mold holding table, a material discharging chute provided with an adjustable terminal section, a tamping mechanism adjustable toward and from the axis of rotation of the table and also carrying the terminal member of the material discharging chute, and a trowel mounted on the tamping mechanism and participating in the movements of adjustment of the latter.

15. In a machine of the class described, the combination of a mold-holding table, a tamping mechanism associated therewith, a member carried by the said mechanism, a chute section, an arm mounted on the member for adjustably supporting the chute section, and a spring acting on the arm for holding the same in different positions of adjustment.

16. In a machine of the class described, the combination of a mold-holding table, a tamping mechanism associated therewith, a supporting element, a trowel fulcrumed on the element, a chute-supporting arm mounted on the element, and a spring acting on the trowel and arm for holding each separately in different positions.

17. In a machine of the class described, a mold holding table, a tamping mechanism adjustable radially with reference to said table, a material elevating mechanism, and a chute between the upper end of the mechanism and the table for directing material into a mold mounted on the table, said chute including an intermediate hinged section, and a terminal section on to which the hinged section discharges, said terminal section being carried by and participating in the movements of adjustment of the tamping mechanism.

18. In a machine of the class described, a mold holding table, a tamping mechanism adjustable radially with reference to said table, a material elevating mechanism, and a chute between the upper end of the mechanism and the table for directing material into a mold mounted on the table, said chute including an intermediate hinged section, and a terminal section on to which the hinged section discharges, said terminal section being carried by and participating in the movements of adjustment of the tamping mechanism, the terminal section of the chute being also provided with means for adjustment up and down with reference to a mold mounted on said table.

19. In a machine of the class described, a supporting frame, a rotatable mold holding table mounted thereon, a tamping mechanism carried by said frame and adjustable in a direction radial to the axis of the table, a material elevating mechanism, and a chute disposed between the upper end of the elevating mechanism and the table for directing material into a mold on the table, said chute having a fixed portion and another intermediate portion hinged thereto and both carried by the frame, and a terminal portion in receiving relation to the hinged portion for conveying the material directed into the mold, said terminal portion being mounted on and adjustable with the tamping mechanism.

20. In a machine of the class described, a mold supporting table, separate radial shafts disposed under the table on opposite sides of the axis thereof and in the same diametric line, wheels mounted on the shafts and adjustable toward and from the axis of rotation of the table to impart different speeds of rotation to the latter, a third shaft also below the table, gearing between one of the first mentioned shafts and said third shaft, and driving means between the other one of the first mentioned shafts and said third shaft.

In testimony, that I claim the foregoing as my own, I have hereto affixed my signature in the presence of two witnesses.

ALLEN GLENN.

Witnesses:
ALLEN B. DUNORST,
WM. P. COX.

Copies of this patent may be obtained for five cents each, by addressing the "Commissioner of Patents, Washington, D. C."